Figure 2A:
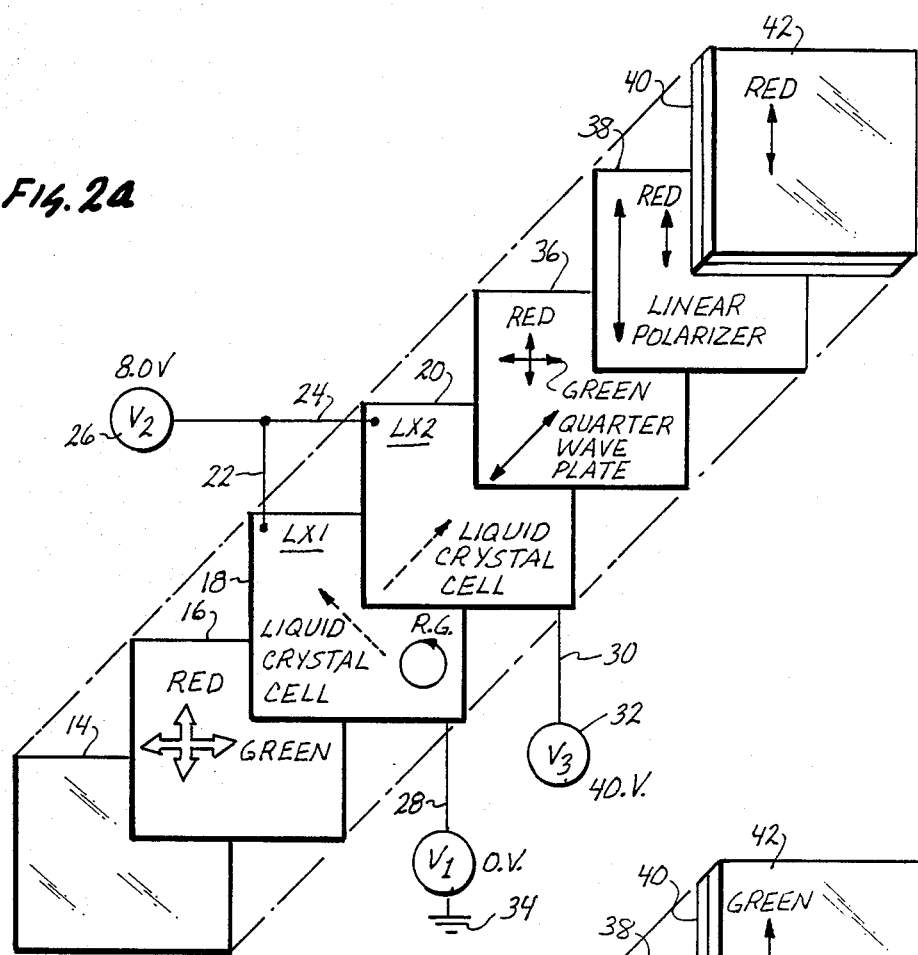

United States Patent [19]

Kalmanash et al.

[11] Patent Number: 4,770,500
[45] Date of Patent: Sep. 13, 1988

[54] METHOD AND APPARATUS FOR MULTI COLOR DISPLAY

[75] Inventors: Michael H. Kalmanash, Los Altos; James L. Fergason, Atherton, both of Calif.

[73] Assignee: Kaiser Aerospace and Electronics Corporation, Oakland, Calif.

[21] Appl. No.: 872,520

[22] Filed: Jun. 10, 1986

[51] Int. Cl.[4] .......................... G02F 1/13; G02B 5/30; G02B 1/23

[52] U.S. Cl. .................. 350/347 E; 350/335; 350/347 R; 350/378; 350/388

[58] Field of Search ............... 350/347 R, 347 E, 335, 350/378, 387, 388, 389, 391; 358/242, 58

[56] References Cited

U.S. PATENT DOCUMENTS

| | | | |
|---|---|---|---|
| 3,407,017 | 6/1964 | Fleisher et al. | 350/388 |
| 3,781,465 | 12/1973 | Ernstoff et al. | 350/335 |
| 4,385,806 | 5/1983 | Fergason | 350/347 R |
| 4,582,396 | 4/1986 | Bos et al. | 350/347 E |
| 4,674,841 | 6/1987 | Buzak | 350/347 E |

Primary Examiner—Stanley D. Miller
Assistant Examiner—Huy V. Mai
Attorney, Agent, or Firm—Marvin H. Kleinberg

[57] ABSTRACT

An apparatus and method for producing a color display from a substantially monochromatic source utilizes a liquid crystal cell combination together with a plechroic filter to differentially polarize the light components comprising the light emitted from the source. The liquid crystal cells are connected in push-pull fashion to individually retard light by one fourth of a wave as a function of the control signal applied to them. A fourth wave plate followed by a linear polarizer completes the optical combination. A signal at a first level applied to the cells causes transmission of one component color and blocks the other. A signal at a second level blocks the one component color and transmits the other. An intermediate level signal transmits both colors, resulting in a third, combination color.

15 Claims, 3 Drawing Sheets

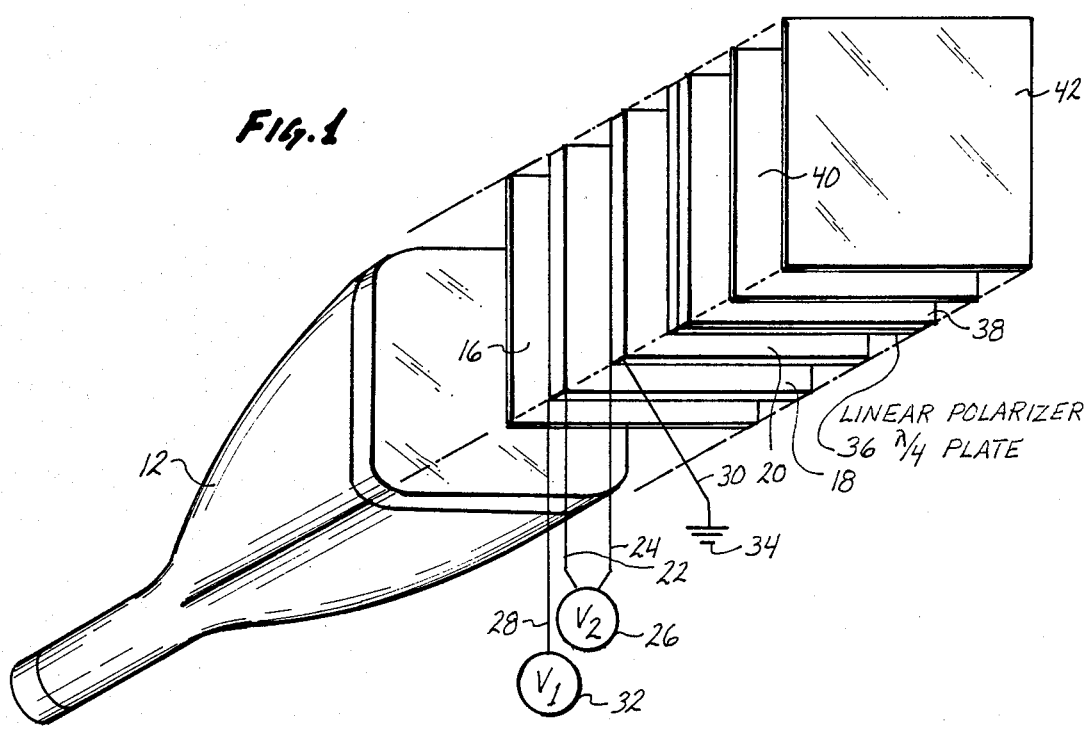
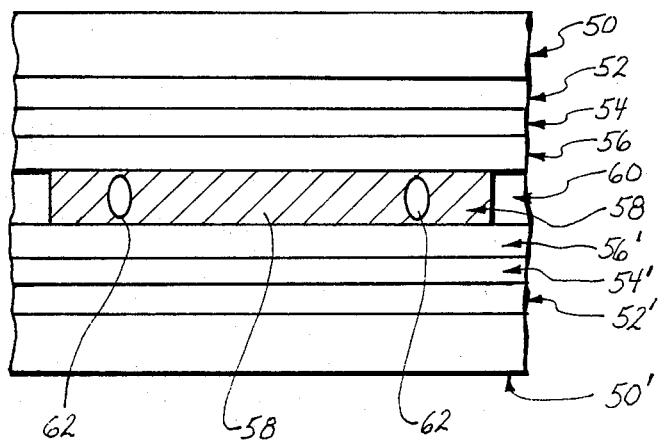

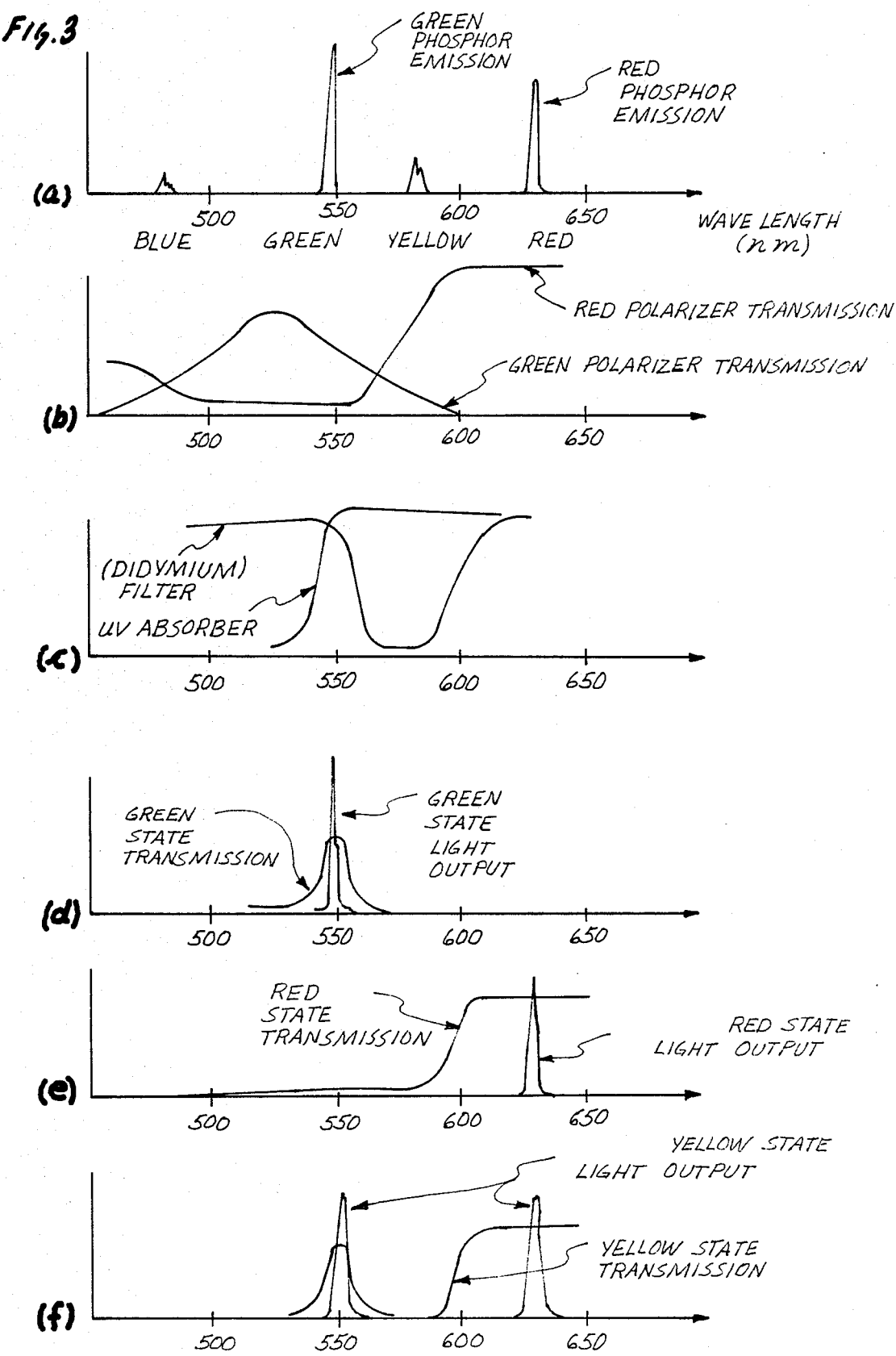

METHOD AND APPARATUS FOR MULTI COLOR DISPLAY

The present invention relates to a method and apparatus for producing multi color displays and, more particularly, to a liquid crystal cell combination which acts as an optical switch to display selected colors from an apparently monochromatic source.

It is well known in the prior art that an apparently monochromatic source such as a cathode ray tube (CRT) can provide a multi color display. From the earliest experiments in color television which used a rotating color wheel together with a CRT, it was possible to place images on the screen in synchronism with the color wheel so that a number of colors could be visualized. This phenomenon was as much a product of the persistence of the image in the human eye as the synchronization of certain images to the concurrent presentation of a filter of preselected color.

The development of the shadow mask tube and the use of triads of monochromatic phosphors was deemed preferable to the electromechanical color wheel and, as a result, the color television industry abandoned the electromechanical approach. It has been taught in the past that a polychromatic source which appears to be monochromatic (from the mixing of the colors) can provide images in the principal colors or in colors which result from the mixture of the principal colors.

PRIOR ART

An early approach to an electronic field sequential color television system was described in the patent to Ernstoff et al U.S. Pat. No. 3,781,465, which issued Dec. 25, 1973. That patent showed a monochromatic CRT with a tri-color liquid crystal assembly that included red, blue and green cells. Electronic circuitry switches the three cells sequentially to provide a series of single color images in rapid succession that, to the eye of the human observer, appear to be in full color.

A different approach was described by Hilsum et al in U.S. Pat. No. 4,003,081, issued Jan. 11, 1977. Their approach, which is the precursor to the approach of the present invention, was to select a CRT that produced an image in at least two colors combined with an electrically controlled filter element. The filter was a liquid crystal material capable of transmitting separately different colors depending upon the applied energizing signals. In a preferred embodiment, video images from a first source, such as radar, were to appear in one color while video images from a second source, such as a computer, were presented in a second color. Alternative embodiments included a field sequential color display which includes a third filter so that a three color combination is available.

The patent to Fergason, U.S. Pat. No. 4,385,806, which issued May 31, 1983, taught a liquid crystal device light shutter in combination retardation with retarding wave plates to compensate for the retardation in the device operating under a bias. Utilizing a bias, the operation of the shutter devices could be speeded up and the retardation plates compensated for the normal birefringence of the cells.

In a continuation-in-part of Fergason, U.S. Pat. No. 4,436,376, issued Mar. 13, 1984, a pair of liquid crystal cells were operated in the manner of a push-pull amplifier in that each cell was operated to impart its own phase shift to a passing optical beam. The application of a bias to the cells aligns the preponderance of the crystals except for the layers immediately adjacent the electrodes. The application of incremental electrical signals across the conducting surfaces achieves a rapid on-off cycle for the cell. The cells thus taught were utilized as a communications link and information was modulated on a light beam by means of applied electrical signals to the cells. Signals that were 180° out of phase were applied to the two cells for push-pull operation.

The general idea of using a "black and white" CRT in conjunction with liquid crystal cells and color polarizers was described by Brinson et al in IBM Technical Disclosure Bulletin Vol. 22, No. 5 of October, 1979. Because a full three color capability is desired, a first liquid crystal cell is followed by a first color polarizer and a second liquid crystal cell is followed by a second color polarizer. Essentially "white" light is transmitted through a linear polarizer and, depending upon the state of the first cell, either cyan or red is passed to the second cell. Depending on the state of this cell, either blue or yellow is passed. The net output of the combination is then either blue, red, green, or black at any instant of time. During a presentation, the net colors would be "mixed" by having images persist through more than one output color phase to provide a substantially full palette of colors.

A slightly different approach was disclosed by Shanks et al in U.S. Pat. No. 4,328,493, issued May 4, 1983. A CRT which emits at least two different colors is combined with first and second color selective polarizers, a liquid crystal cell and a neutral linear polarizer. The liquid crystal cell in one condition rotates the plane of applied polarized light and in a second condition transmits the light without rotation. The cell is then switched in synchronism with the presentation of the images that are to be seen in color. Because the cells cannot be switched between states in the time available during television transmissions, only one half of the cell is switched at a time and the electrodes are driven accordingly.

In the recently published U.K. patent application of Bos et al No. GB 2 139 778 A, published Nov. 14, 1984, corresponding to a U.S. application, Ser. No. 493,106, filed May 9, 1983, now U.S. Pat. No. 4,582,396, issued Apr. 15, 1986, a field sequential color system disclosed a liquid crystal cell which functioned as a variable optical retarder in a polarizing system which included pleochroic filters which selectively transmit a first or a second color, depending upon the polarization of the light. A color sensitive polarizing means is placed in front of a CRT which is capable of emitting light of at least two colors. A first absorption axis passes linearly polarized light of the first color and a second absorption axis passes linearly polarized light of the second color. The liquid crystal cell is followed by a linear polarizer.

When the liquid crystal cell is driven by a first signal, it provides a half wave retardation to applied light. When driven by a second signal, substantially no retardation is experienced by the impinging light. With substantially no retardation of light, only light of one of the colors can pass through the linear polarizer. With half wave retardation, only light of the other of the colors can pass through the polarizer.

A specially designed liquid crystal cell functions as the variable retarder. A nematic liquid crystal cell is designed to be disclination-free and to switch in a "bounce-free" manner as it is switched between two states which alter the orientation of the surface noncontacting directors of the liquid crystal material in the cell.

SUMMARY OF INVENTION

It has been deemed desirable to find a suitable variable retarder which can be operated at higher speeds than those attributable to the structure of the 8os et al application. Accordingly, there has been developed a field sequential color display system comprising, a source of light of at least two different wavelengths, light polarizing means in optical communication with said source, including a color selective polarizing filter having first and second substantially orthogonally oriented absorption axes, the first absorption axis passing linearly polarized light of a first color and the second absorption axis passing linearly polarized light of a second color.

Variable optical retarding means are disposed between said color selective polarizing filter and a circular polarizing means for selectively tranmitting light of a color determined by the amount by which the light emitted by said source is optically retarded in said retarding means. Control means coupled to said variable optical retarding means regulates the amount of optical retardation imposed by said retarding means upon light transmitted therethrough. Accordingly, said retarding means are capable of at least first and second retardations, resulting in the emission of light of at at least first and second colors.

In a preferred embodiment, the light emitted from said source is modulated in synchronism with said control means to produce images appearing to have a multi colored appearance. This is accomplished through the use of variable optical retarding means comprising first and second liquid crystal cells and control means including a source of electric potential at first and second levels and means for applying to each of said cells said electric potential levels for determining the amount of optical retardation imposed by each of said cells.

The purity of the displayed colors is enhanced by the use of a first filter means in the optical path between said source and light polarizing system and a second filter at the output of said circular polarizing means for limiting emitted light to said first and second colors at said color selective polarizing means which eliminates unwanted colors from the output of said system.

The contrast of the displayed scene is also enhanced through the use of the filter means in that incident ambient light in spectral regions where CRT phosphors emit no light is absorbed. For maximum benefit in contrast improvement, the filters are located at the "output side" of the combination, a placement that is not critical if improved color purity were the only goal.

To enable an increase in the speed of operation of the variable optical retarding means, each said liquid crystal cell is capable of optically retarding light by one fourth of a wave upon application of a potential at said first level and ot imposing no retardation upon the application of a potential at said second level.

To better understand why the arrangement of the present invention provides a marked advantage both in speed and in independence from the effects of temperature, it should be noted that all liquid crystal devices have a "preferred" or relaxed state which might be considered the "off" state in the absence of an applied voltage. Cells can be driven "on" by application of a voltage and, the speed of turn on response can be related to the magnitude of the applied voltage. The turn on of a cell is largely independent of temperature.

When the voltage on a cell is removed, the cell "relaxes" to the "off" state. However, the time required for turn off is dependent upon temperature and if temperatures are reduced below 20° C., the time required is markedly increased. Of course, if a cell need only relax from fully "on" to partially "on" with a quarter wave retardation, the time required is much less than if it had to relax to the half wave retardation condition.

Because the present invention employs two cells in a "push-pull" configuration, when one cell is being driven "on", the other cell is relaxing from "on" to a quarter wave retardation condition. The response of the one cell is therefore independent of temperature and the other cell is only slightly affected by temperature. As a result, the operating speed of the combination of the present invention can be markedly higher than systems of the prior art.

The first and second liquid crystal cells are oriented with their optic axes at right angles to each other, and at forty five degrees with respect to the polarizing axes such that upon the application of a potential at said first level, one of said cells converts linearly polarized light to right hand, circularly polarized light, which passes through the circular polarizer with a net retardation of one half wave (ninety degree rotation), and the other of said cells imposes substantially no retardation on impinging light. Upon the application of a potential at said second level, the first of said cells imposes substantially no retardation, and the second of said cells converts linearly polarized light to left hand circularly polarized light which passes through the circular polarizer with a net retardation of substantially zero or no rotation.

In the preferred embodiment, the two liquid crystal cells are placed "back-to-back" with adjacent electrodes commonly connected to a source of signal voltage. The remaining electrodes are connected between a potential source and a source of common reference potential or ground. The signal voltage source then swings between two intermediate voltages, one of which places a substantial voltage drop across the first cell but not the second and the other of which places the substantial voltage drop across the second cell but not the first. This can be accomplished by setting the reference level to equal the sum of the signal levels.

If a signal at the first, or "lower" level is applied, the cell across which the lower potential exists will be a quarter-wave retarder while the other cell across which the higher potential exists will be a "zero" retarder. When a signal at the second, or "higher" level is applied, the cell which had previously experienced the lower potential will now be subjected to the higher potential and will now be a "zero" retarder while the other cell, previously the "zero" retarder will experience the lower potential and become the quarter-wave retarder. In one experimental set up, a signal voltage swung between 8 and 32 volts and the reference voltage level was set at 40 volts. With the signal voltage at 8 volts, one cell had a 8 volt potential difference across its electrodes while the other cell had a 32 volt difference. When the signal voltage switched to 32 volts, the voltage differences across the cells also switched.

Because the cells are oriented at right angles to each other, and referring to the description of operation, above, with one signal, the combination converts linearly polarized light to right hand circularly polarized light which passes through the circular polarizer with a net retardation of one half wave or 90°. The other signal results in the conversion of linearly polarized light to left hand circularly polarized light which passes through the circular polarizer with substantially no net retardation. As a result, there is a one half wave difference in retardation depending upon which of the signal voltages is applied to the combination.

Figure 2B:
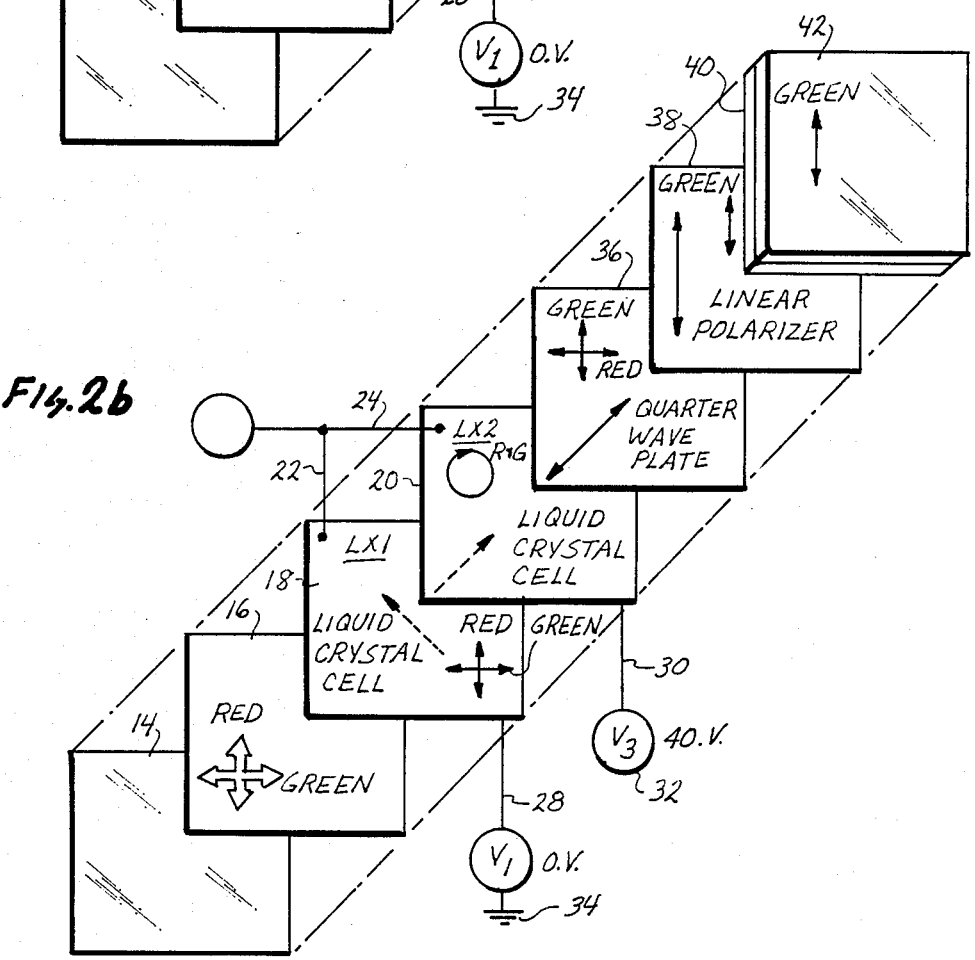

Further advantages and features of the present invention will be more fully apparent to those skilled in the art to which the invention pertains from the ensuing detailed description thereof, regarded in conjunction with the accompaning drawings wherein like reference characters refer to like parts throughout and in which:

FIG. 1 is side view of a three color television display;

FIG. 2 including FIGS. 2a and 2b are developed diagrammatic views of the elements of the display assembly showing the polarizations necessary for a red and green images, respectively;

FIG. 3 including FIGS. 3a through 3f is a graph of wave forms of light transmission vs. wavelength to illustrate the components of the light being produced and transmitted to the viewer. and FIG. 4 is a sectional view of a liquid crystal cell combination for use in the combination of FIG. 1.

Turning first to FIG. 1, there is shown in idealized side view, the elements comprising the display 10 of the present invention. A CRT 12 displays information in the form of a pattern of illuminated phosphors. Preferably, a special tube is utilized which, when energized, emits light in at least a first and a second narrow range of wavelengths. In the absence of any special "color switch", the display would appear to be monochromatic.

In the preferred embodiment of the present invention, a color polarizer or plechroic filter 18 adjacent the CRT 12 responds to light to transmit either red or green polarized light. In the preferred embodiment, the filter 16 is oriented to polarize red light in the vertical direction and green light in the horizontal direction.

A pair of liquid crystal cells 18, 20 are mounted adjacent each other. The inner or signal electrodes 22, 24 of the cells 18, 20 are commonly connected to a first source 26 of signal voltage. The outer or bias electrodes 28, 30, of each cell 18, 20 are respectively connected to a source 32 of bias potential and a source 34 of common reference potential or ground.

A quarter wave plate 36 is followed by a linear polarizer 38. The combination acts as a circular polarizer. A didymium filter 40 reduces the transmission of ambient light. This helps to prevent ambient light from reaching the CRT through the combination of elements and, to the extent that ambient light does penetrate, when reflected from the CRT face, will be further attenuated by the filter. Ultra violet filter 42 completes the combination and blocks additional unwanted light.

The plechroic filter 16 is oriented so that the red and green polarizations are orthogonal. The liquid crystal cells 18, 20 are aligned with their directors or slow axes at a 45° angle to the vertical polarization axis of the plechroic filter 16. For ease of explanation, it will be assumed that the slow axis of the first liquid crystal cell 18 is aligned at −45° to the vertical or "red" polarization axis of the plechroic filter 16 and that the slow axis of the second liquid crystal cell 20 is aligned at +45° to the "red" axis. The quarter wave plate 36 is aligned with its slow axis parallel to the slow axis of the second liquid crystal cell 20. The linear polarizer 38 is oriented to be parallel to the red polarization axis of the plechroic filter 16.

In a preferred embodiment of the system, the voltage chosen for the bias potential source was +40 v. with the source 32 of common 34 at 0 v. In this embodiment, the first signal voltage was then +8 v. and the second signal voltage was +32 v. For a yellow output signal in the preferred embodiment, an intermediate signal of +20 v. was used. An alternative method of achieving yellow requires that a signal equivalent to the bias voltage of +40 v. be applied to the signal electrodes 22, 24 while both bias electrodes 28, 30 are coupled to the common source 34. The alternative method requires somewhat more complexity in the provision of the electrical potentials and signals, and does require that the bias voltage applied to one or both bias electrodes might require some adjustment, but the viewing angle would be improved.

Turning to FIG. 2a, a portion of the display is illustrated to explain the production of a "red" image. As seen, the plechroic filter 16 polarizes "red" light in the vertical direction. To provide the "red" image, an 8 volt signal is applied to the signal electrodes 22, 24. As shown, the effect is to change the transmission characteristics of the first liquid crystal cell 18 to impart a retardation of one quarter wave to the polarized light from the plechroic filter 16. The quarter wave retardation circularly polarizes the light that is transmitted to the second liquid crystal cell 20. Because a much larger potential exsists across the second cell 20, the cell is fully "on" and therefore imparts no retardation to the impinging light.

The circularly polarized light from the liquid crystal cells 18, 20 reaches the quarter-wave plate 36 and becomes linearly polarized. Since the slow axis of the first liquid crystal cell 18 is orthogonal to the slow axis of the quarter wave plate 36, the retardations cancel and the net retardation of the transmitted beam is effectively zero. Therefore the vertically polarized "red" light component will remain vertically polarized and will pass the linear polarizer 38 whose polarization axis is vertical. The "green", horizontally polarized component will be blocked and the image will be transmitted as red.

In FIG. 2b, the production of the "green" image is illustrated. As seen, the plechroic filter 16 polarizes "green" light in the horizontal direction. To provide the "green" image, a 32 volt signal is applied to the signal electrodes 22, 24. Because a much larger potential exists across the first cell 18, the cell is fully "on" and therefore imparts no retardation to the impinging light. However, a voltage drop of 8 volts across the second cell 20 changes the transmission characteristics of the second liquid crystal cell 20 to impart a retardation of one quarter wave to the polarized light from the plechroic filter 16. The quarter wave retardation circularly polarizes the light that is transmitted to the quarter-wave plate 36.

At the quarter-wave plate 36 the light becomes linearly polarized again. Since the slow axis of the second liquid crystal cell 20 is parallel to the slow axis of the quarter wave plate 36, the retardations add and the net retardation of the transmitted beam is effectively one half wave. Therefore the vertically polarized "red" light component will be "rotated" through 90° as will the "green", horizontally polarized component. The "green" component, now vertically polarized, will pass the linear polarizer 38 whose polarization axis is vertical. However, the "red" component, being horizontally polarized, will be blocked and the "green" image will be transmitted.

If both of the liquid crystal cells 18, 20 retard the transmitted light by the same amount, (a condition that obtains when the same potential exists across both cells), since they are oriented in opposite directions, their effect will be effectively be cancelled and only the quarter wave plate 36 will impose a retardation, circularly polarizing the transmitted beam. The linear polarizer 38 cannot block either the "red" or the "green" component and therefore the resultant image will be in the color resulting from the combination of colors, in this example, "yellow".

FIG. 3 can help to explain why the system works in the way that it does. FIG. 3a is a graph of light intensity plotted against wavelength. In the preferred embodiment, a CRT 12 is selected that emits light in two, rather narrow and well defined bands in the "green" and "red" portions of the spectrum. One of the phosphors provides "green" light at about 550 nm while the other of the phosphors provides "red" light at about 630 nm. Some emission may occur in the "blue" region at about 480 nm and in the yellow region at about 580 nm.

In FIG. 3b, the transmission characteristics of the plechroic filter 16 are shown in a graph that plots transmission of light against wavelength. As shown, the "green" polarizer exhibits a rather wideband transmission with a maximum at about 515 nm. The "red" polarizer blocks most light between 500 and 560 nm and transmits all light from 600 nm.

FIG. 3c illustrates the transmission characteristics of the filters selected for the preferred embodiment. The dydimium filter 40 passes most light except for a relatively narrow band of light between 560 and 610 nm. The ultra violet filter 42 blocks light below 540 nm and transmits virtually everything above that wavelength. These highly selective characteristics have been matched to carefully chosen phosphors with very narrow band emissions. The filters have been matched to the CRT to optimize the contrast and purity of the images that are produced by the system.

In FIGS. 3d and 3e, the graphs illustrate how the resulting transmission characteristics of the filters are matched to the emission characteristics of the phosphors. As seen, there is a "window" with a maximum transmission at 550 nm which coincides with the peak of the "green" phosphor output. For the "red" emissions, the filter combination provides for transmission of all light longer than 600 nm. The "red" phosphor peaks at 630 nm, well within the range of maximum transmission.

Because the provision of the "yellow" image results from the transmission of both the "red" and the "green" components, FIG. 3f is a composite of FIGS. 3d and 3e. As can be seen, the "green" and "red" emissions are simultaneously transmitted through the filter pass bands and the resultant image appears as yellow, which is the monochromatic color output of the CRT 12 prior to any modification by the system 10 of the present invention.

Turning next to FIG. 4, the structure of a single liquid crystal cell 18 is illustrated. The cell is symmetrical in its construction and identical elements will be distinguished by primed reference numerals. A glass plate 50, 50' is exterior to the cell. The inner surface of the plate 50, 50' has a layer of indium tin oxide 52 and a layer of silicon oxide 54 next to it. The indium tin oxide 52, 52' layers act as electrodes to apply an electric field across the cell. The silicon oxide 54, 54' layers are insulators.

A polyimide layer 56 is formed on the silicon oxide 54 layer and is the surface that contacts the liquid crystal material 58. A perimeter gasket 60 is provided to seal in the liquid crystal material 5R. Spacers 62 may be employed to keep the separation of the two glass plates 50, 50' uniform. In order to achieve the desired liquid crystal display effects, the polyimide layer 56 must be rubbed in a predetermined direction which orients the cell and determines the director or slow axis direction of the cell.

In alternative embodiments, a dual cell may be constructed with both cells sharing a central glass plate. In this arrangement, the central plate has, on both faces, the indium tin oxide, silicon oxide and polyimide layers. Such a construction eliminates one plate of glass in the combination and reduces, slightly the internal attenuation of light that the glass plate might provide.

The operation of the liquid crystal cells is well documented in the prior art set out above. In the present invention, it is both the operation of the cells at the quarter-wave retardation level and the "push-pull" arrangement of cells that provide the advantages of rapid switching and improved viewing angle.

By utilizing the quarter wave retardation in combination with a quarter wave plate, the condition of the cell can be switched rapidly with no "bounce" or lag. Since the cell merely has to shift between to fully "on" with no retardation to partially "on" providing quarter-wave retardation, only the liquid crystal layers immediately adjacent the electrodes need be re oriented. The system of the present invention does not operate with a cell "off" or fully relaxed, or in the half wave retardation mode with the cell mostly "off".

Other embodiments and variations will appear to those skilled in the art. Accordingly, the scope of the invention should be limited only by the claims appended hereto.

What is claimed as new is:

1. A field sequential color display system comprising:
    (a) a source of light of at least two different wavelengths;
    (b) light polarizing means in optical communication with said source, including a color selective polarizing filter having first and second substantially orthogonally oriented absorption axes, the first absorption axis passing linearly polarized light of a first color and the second absorption axis passing linearly polarized light of a second color;
    (c) circular polarizing means including a quarter wave plate having a slow axis rotationally displaced by 45° from one of said absorption axes in optical communication with said light polarizing means for selectively transmitting light of a color determined by the amount by which the light emitted by said source is optically retarded;
    (d) variable optical retarding means having first and second orthogonally oriented slow axes, one of said slow axes being aligned parallel to said quarter wave plate slow axis, disposed between said color selective polarizing filter and said circular polarizing means for retarding light applied to said circular polarizing means; and
    (e) control means coupled to said variable optical retarding means for controlling the amount of optical retardation imposed by said retarding means upon light transmitted therethrough, whereby said retarding means are capable of at least first and second retardations resulting in the emission of light of at least first and second colors.

2. The sequential color display system of claim 1, in which the light emitted from said source is modulated in synchronism with said control means to produce images appearing to have a multi colored appearance.

3. The display system of claim 1 including a first filter means in the optical path between said source and light polarizing system and a second filter at the output of said circular polarizing means for limiting emitted light to said first and second colors at said color selective polarizing means, to eliminate unwanted colors from the output of said system and to improve display contrast by reducing reflected ambient light without substantially affecting display brightness.

4. The display system of claim 1 in which the variable optical retarding means comprises first and second liquid crystal cells and said control means include a source of electric potential at first and second levels and means for applying to each of said cells said electric potential levels for determining the amount of optical retardation imposed by each of said cells.

5. The display system of claim 4 in which said first and second liquid crystal cells are serially connected between a source of reference potential and a source of common reference potential and said reference potential is set to be equal to the sum of said first and second levels, and said means for applying said potential levels is coupled to the interconnection of said first and second cells.

6. The display system of claim 4, wherein each said liquid crystal cell is capable of optically retarding light by up to one fourth of a wave upon application of a potential at said first level and of imposing substantially no retardation upon the application of a potential at said second level.

7. The display system of claim 5, wherein each said liquid crystal cell is capable of optically retarding light by up to one fourth of a wave upon application of a potential at said first level and of imposing substantially no retardation upon the application of a potential at said second level.

8. The display system of claim 4, wherein said first and second liquid crystal cells are oriented with respect to the optical axis such that upon the application of a potential at said first level, one of said cells converts linearly polarized light to right hand circularly polarized light and the other of said cells passes light substantially without retardation resulting in light passing through said circular polarizing means with a net retardation of one half wave (90° rotation), and upon application of a potential at said second level, the said one of said cells imposes substantially no retardation on impinging light and the said other of said cells converts linearly polarized light to left hand circularly polarized light which passes through said circular polarizing means with substantially no retardation.

9. A method of providing a field sequential color display in a high ambient light environment comprising the steps of:
 (a) generating a source of light having at least two different wavelength components;
 (b) polarizing the light thus generated using a color selective polarizing filter having first and second substantially orthogonally oriented absorption axes, the first absorption axis passing linearly polarized light of a first color and the second absorption axis passing linearly polarized light of a second color;
 (c) circularly polarizing said polarized light utilizing a polarizer having a slow axis rotationally displaced by 45° from one of said absorption axes for selectively transmitting light of a color determined by the amount by which the light has been optically retarded;
 (d) selectively retarding light applied to said circular polarizing means utilizing variable optical retarding means, having at least one slow axis parallel to said polarizer slow axis, disposed between said color selective polarizing filter and the circular polarizer; and
 (e) controlling the amount of optical retardation by at least first and second retardations to result in the emission of light of at least first and second colors.

10. The method of providing a color display of claim 9 in which the light emitted from said source is modulated in synchronism with a predetermined control system to produce images appearing to have a multiple colors.

11. The method of providing a color display of claim 9 including the steps of filtering the light at the beginning and end of the light path before and after the light polarizing step and the circular polarizing step for limiting emitted light to said first and second colors to eliminate unwanted colors from the output of said system and to improve display contrast by reducing reflected ambient light without substantially affecting display brightness.

12. The method of providing a color display of claim 9 in which the variable optical retarding step includes applying first and second control signals to liquid crystal cells which are intergosed in the light path between said polarizing filter and said polarizer for determining the amount of optical retardation imposed by each of said cells.

13. The method of providing a color display of claim 9 including the step of connecting said first and second liquid crystal cells serially between a source of reference potential and a source of common reference potential wherein said reference potential is set to be equal to the sum of first and second potential levels, one of said levels resulting in a first retardation and the other of said levels resulting in a second retardation and applying a selected one of said potential levels to the interconnection of said first and second cells to result in a first potential being applied across one of said cells and a second potential being applied across the other of said cells.

14. The method of providing a color display of claim 12 or 13 including the step of optically retarding light up to one fourth of a wavelength in said liquid crystal cell upon application of a potential at said first level and of imposing substantially no light retardation upon the application of a potential at said second level.

15. The method of providing a color display of claim 12 including the steps of orienting said first and second liquid crystal cells with respect to the absorption axes such that upon the application of a potential at said first level, one of said cells converts linearly polarized light to to right hand circularly polarized light and the other of said cells passes light substantially without retardation resulting in the circular polarizing step imparting a net retardation of one half wave (90° rotation), and upon application of a potential at said second level, the said one of said cells imposes substantially no retardation on impinging light and the said other of said cells converts linearly polarized light to left hand circularly polarized light which passes through the circular polarizing step which substantially no retardation.

* * * * *